United States Patent
Cooney et al.

(10) Patent No.: US 6,824,205 B2
(45) Date of Patent: Nov. 30, 2004

(54) ROOF WIND DEFLECTOR/RAIN PROTECTOR

(75) Inventors: Daniel Cooney, Livonia, MI (US); Troy Allan, Howell, MI (US); John E. Long, Highland, MI (US); Karim Dayoub, Royal Oak, MI (US); Hyong Chol Park, Ann Arbor, MI (US); Bryan Tice, White Lake, MI (US)

(73) Assignee: ArivinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/228,429

(22) Filed: Aug. 27, 2002

(65) Prior Publication Data

US 2004/0041445 A1 Mar. 4, 2004

(51) Int. Cl.$^7$ ................................................ B60J 7/05
(52) U.S. Cl. ........................................ 296/213; 296/217
(58) Field of Search ............................. 296/213, 221, 296/217, 152; 454/128–129, 134, 158

(56) References Cited

U.S. PATENT DOCUMENTS

| | | | | |
|---|---|---|---|---|
| 1,935,993 A | * | 11/1933 | Reutter | 296/217 |
| 3,303,769 A | * | 2/1967 | Williams | |
| 3,960,404 A | * | 6/1976 | Bienert | 296/213 |
| 4,679,846 A | * | 7/1987 | Lux et al. | 296/214 |
| 4,702,518 A | * | 10/1987 | Paerisch et al. | 296/217 |
| 5,368,356 A | * | 11/1994 | Gotz et al. | 296/180.1 |
| 6,164,717 A | | 12/2000 | Haagen | |
| 6,390,543 B1 | | 5/2002 | Tolinski | |
| 6,457,769 B2 | * | 10/2002 | Hertel et al. | 296/217 |

FOREIGN PATENT DOCUMENTS

| | | | | |
|---|---|---|---|---|
| DE | 3641033 | * | 6/1988 | 296/217 |
| DE | 4104446 | * | 8/1992 | 296/217 |
| DE | 4402314 | * | 8/1995 | |

* cited by examiner

Primary Examiner—Dennis H. Pedder
(74) Attorney, Agent, or Firm—Carlson, Gaskey & Olds

(57) ABSTRACT

A movable panel assembly includes a panel movable between open and closed positions and also movable to a vented position. In the vented position a mesh member attached on one side to the panel and on another side to a guide or gutter structure extends to substantially cover the opening. The mesh member is flexible and collapses with the gutter guide assembly. The mesh member inhibits the intrusion of water into the passenger compartment and reduces wind noise.

11 Claims, 3 Drawing Sheets

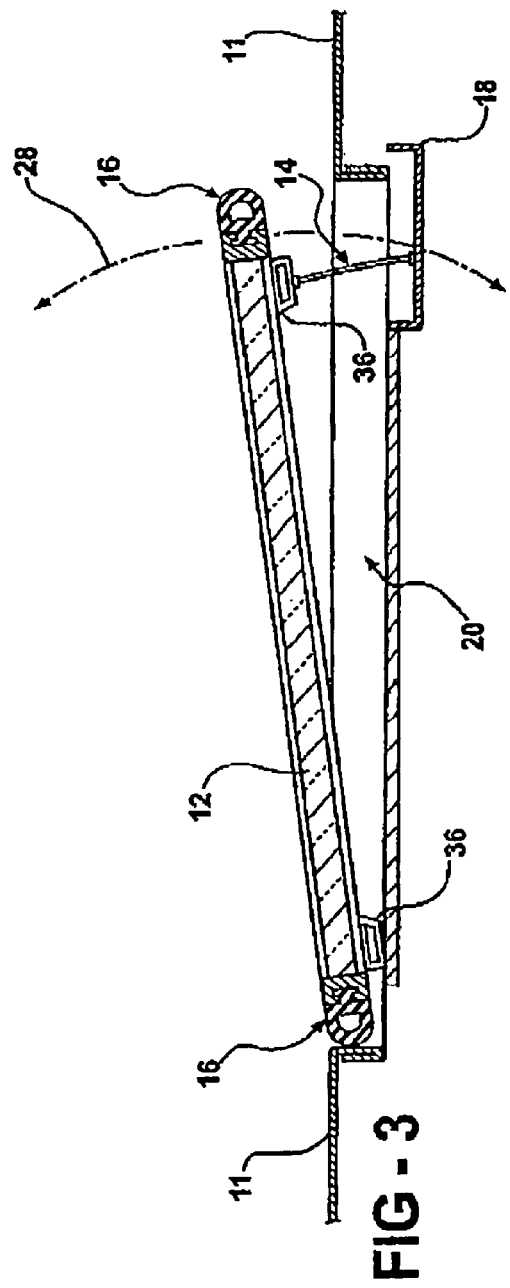
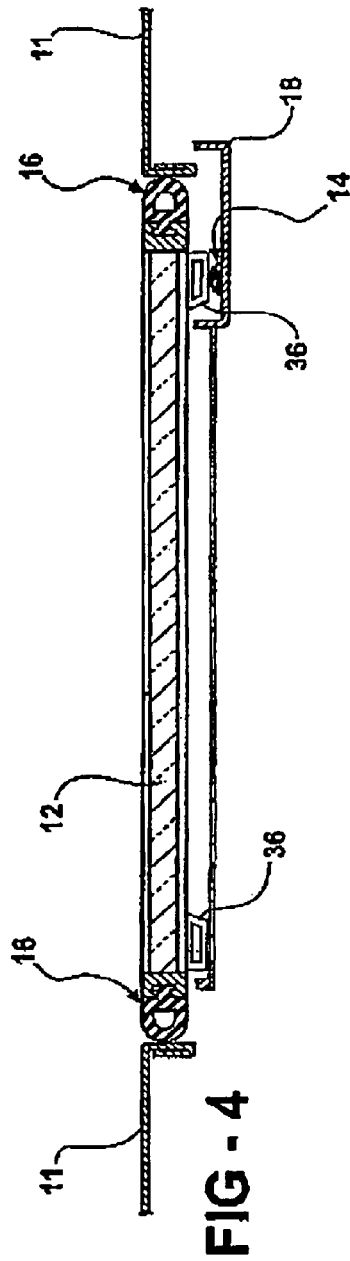

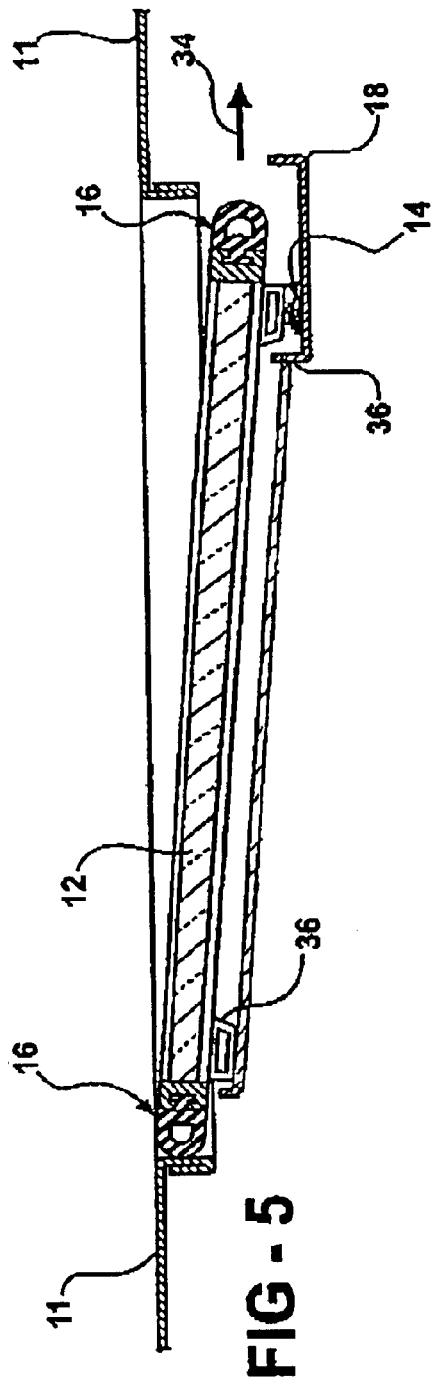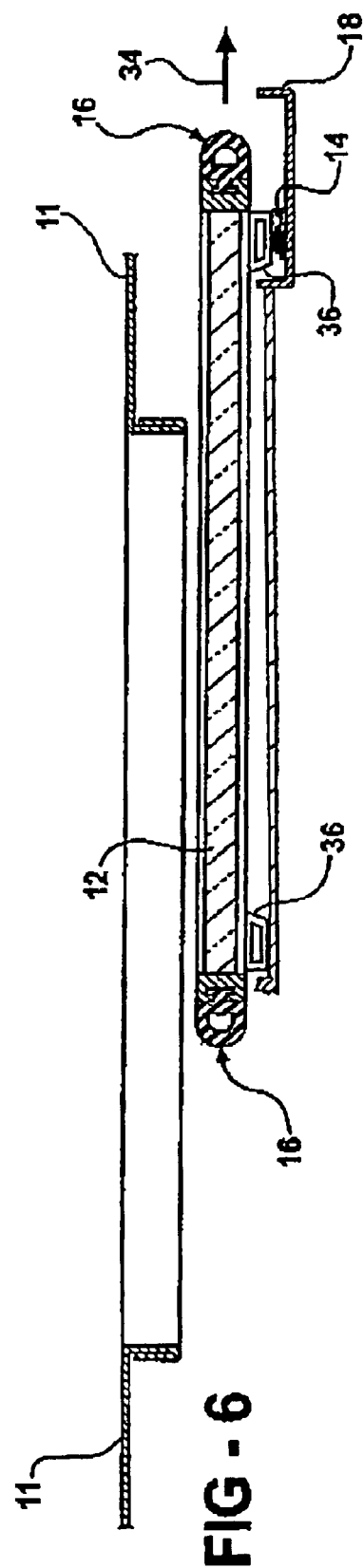

ROOF WIND DEFLECTOR/RAIN PROTECTOR

BACKGROUND OF THE INVENTION

This invention generally relates to a sunroof for a motor vehicle and specifically to a sunroof including a wind deflector and rain protector that reduces noise and prevents rain from entering the vehicle when the sunroof is in a vented position.

Typically, sunroofs are designed to allow a panel to be opened in a sliding direction to the rear of the vehicle to expose the entire opening. Further, many of these same sunroofs are designed to be tilted or pivoted upward by angling a rear portion of the sunroof to open into a vent position. In the vent position, the rear portion of the sunroof is pivoted upward from the motor vehicle roof to form an opening.

When the sunroof is in the vented position, excessive wind noise including a whistling sound may occur as the car is moving. Air flowing over the vented sunroof causes this wind noise. Further, in the vented position an opening is created that may allow rain to enter the passenger compartment of the motor vehicle. As appreciated, this is undesirable and uncomfortable for passengers within the motor vehicle. Often it is desired to open the sunroof to the vent position even when it is raining.

It is known in the art to provide devices to address and reduce such wind noise. One such device includes a seal that extends around the rear portion and two sides of the sunroof and includes a jagged edge. The jagged edge is designed to reduce and break up the turbulent air experienced at the rear of the vented sunroof. Such a device is adequate for simply reducing the wind noise caused by turbulent air whistling over the pivoted rear portion of the sunroof; however, such a jagged shield does not prevent rain from entering the motor vehicle.

Accordingly, it is desirable to develop a device and sunroof that both reduces wind noise caused by the turbulent effects of the sunroof panel, and prevents rain from entering the vehicle passenger compartment while still providing for full opening of the sunroof.

SUMMARY OF THE INVENTION

A disclosed embodiment of this invention is a sunroof for a motor vehicle including a mesh material that extends from the roof panel to a gutter guide assembly to reduce wind noise and substantially prevent rain from entering a motor vehicle.

In an embodiment of this invention, the sunroof includes a mesh material that is attached to a gutter guide portion of the sunroof at one end and to a gutter guide portion of the motor vehicle at a second end. The mesh material is flexible and stretches when the sunroof assembly is pivoted to the vented position and substantially blocks and covers the entire opening created by the sunroof in the vent position. The mesh material extends around three sides of the sunroof to block the entire opening in the vent position. The mesh material is collapsible upon closing of the sunroof and collapses into the gutter guide portion of the sunroof assembly. The gutter guide portion of the sunroof assembly of the motor vehicle moves with the sunroof to the fully opened position by sliding rearward and downward.

Accordingly, the sunroof assembly of this invention reduces the amount of rain entering the vehicle passenger compartment and reduces wind noise by breaking up turbulent effects created by the vented sunroof position.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a cross-sectional view of the sunroof assembly in the vented position;

FIG. 4 is a cross-sectional view of the sunroof assembly in the closed position;

FIG. 5 is a cross-sectional view of the sunroof assembly as it is initiating rearward movement; and FIG. 6 is a cross-sectional view of the sunroof assembly as it is moved rearward to a fully open position.

DETAILED DESCRIPTION OF THE PREFERRED EMBODIMENT

Figure 1:
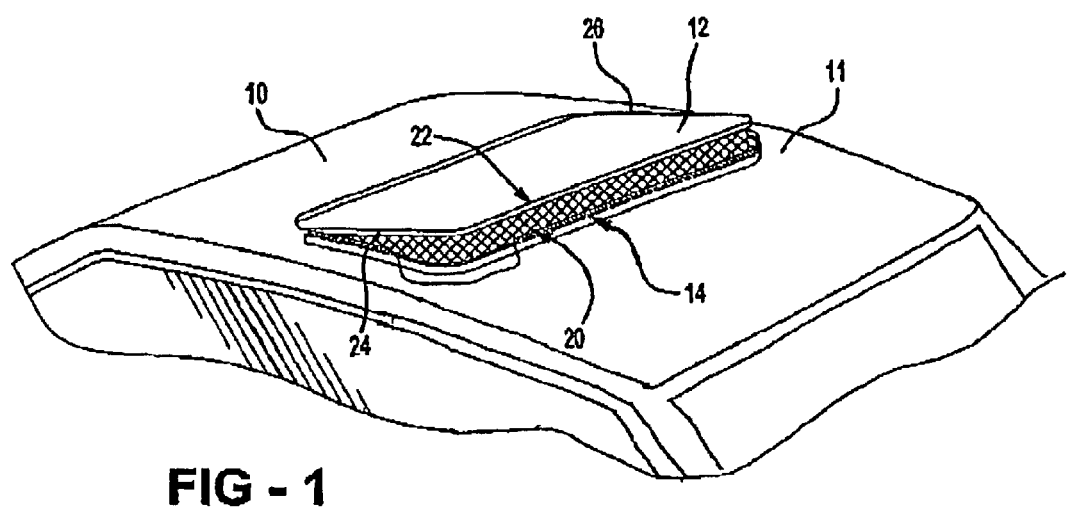
FIG. 1 is a perspective view of the sunroof assembly in the vented position.

Referring to FIG. 1, a motor vehicle 10 has a movable roof panel 12 extendable into a vent position, and which includes a mesh member 14. The mesh member 14 blocks an opening 20 created between the roof panel 12 and the motor vehicle 10. The roof panel 12 is preferably a sunroof window, however, any movable panel assembly for use with a vehicle is within the contemplation of this invention.

In the vent position the rear side 22 of the roof panel 12 is extended above the roof 11 of the motor vehicle 10. The opening 20 is substantially blocked by the mesh member 14 on rear side 22 and first and second sides 24, 26. The meshed member 14 extends about all three sides 24, 26, 22 to prevent at least a portion of any rain from entering the vehicle compartment.

Figure 2:
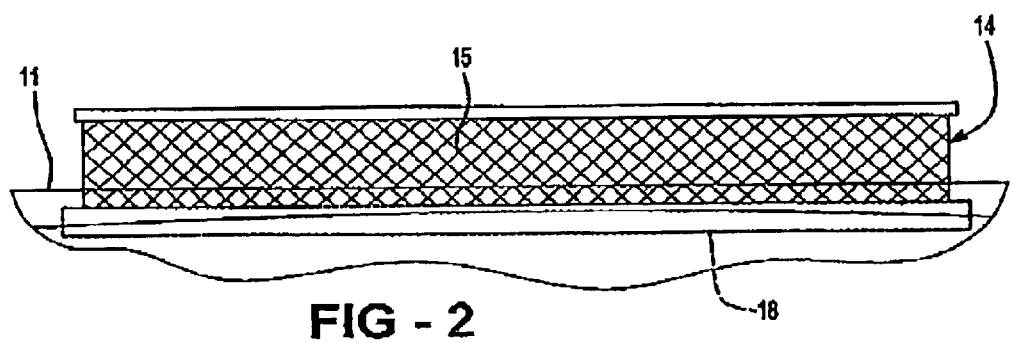
FIG. 2 is a plan view of the mesh material that extends from the sunroof to the motor vehicle.

Referring to FIG. 2, a portion of the mesh member 14 is shown in a plan view. The mesh member 14 is preferably a flexible screen member stretchable between the roof panel 12 and the roof 11 of the motor vehicle 10 and includes a plurality of openings 15 much like that of a typical screen. The mesh member 14 is stretchable to accommodate various positions of the roof panel 12 relative to the roof 11 of the motor vehicle 10. Note a worker skilled in the art would understand various material and configuration substitutions are within the scope of this invention.

Referring to FIG 3, the roof panel 12 is shown in the vent position where the rearward portion 22 of the roof panel 12 extends above the roof 11 of the motor vehicle 10 to create the opening 20. The roof panel 12 includes a seal 16 disposed on each side of the roof panel 12. The seal 16 provides for a water and airproof seal when in contact with the roof 11.

The roof panel 12 pivots about the arc shown at 28 to create the opening 20. The mesh member 14 is attached to a guide portion 36 of the roof panel 12 on a first end and to the gutter guide assembly 18 on a second end. The gutter guide assembly 18 is as known to a worker skilled in the art and provides a means for water evacuation from the area around the roof panel 12. Such configurations of gutter guide assemblies 18 are; as known in the art, and a worker skilled in the art would understand that many configurations are within the scope of this invention. The mesh member 14 is stretchable between the gutter guide assembly 18 and the guide portion 36.

In addition, when the mesh member 14 collapses within the gutter guide assembly 18 of the roof panel 12, it is substantially placed in a position where it does not obstruct movement of the roof panel 12 to the fully opened position. Referring to FIG. 5, the roof panel 12 shown as it tilts downward in preparation for movement rearward to a fully opened position. As the roof panel 12 moves downward into the gutter guide assembly 18, the mesh member 14 further collapses within the gutter guide assembly 18 so as to not obstruct movement of the roof panel 12 rearward as indicated by the arrow 34 towards the fully opened position.

Referring to FIG. 6, the roof panel 12 is shown substantially moved toward the rear as indicated by arrow 34 to a fully opened position. The mesh member 14 is collapsed within the gutter guide arrangement 18 then moves with the roof panel 12 rearward to the fully opened position.

The mesh member 14 substantially prevents rain from entering the passenger compartment of the motor vehicle. The mesh member 14 is provided with a plurality of openings 15 that allows air to exit the motor vehicle in a venting arrangement while substantially preventing rain from entering the motor vehicle through the plurality of openings 15. As appreciated, water may penetrate the openings 15. During movement of the vehicle 10 down an incline, it is possible that the mesh member 14 may be exposed to direct rain fall, still the mesh member 14 would disrupt entry of rain into the passenger compartment. This is a minimal occurrence and the amount of moisture or rain that would be able to penetrate the mesh member 14 under such conditions is minimal and is acceptable to a passenger within the vehicle.

As appreciated, the mesh member 14 surrounds three sides of the roof panel 12 and is flexible to allow for various venting positions of the roof panel 12. It is known to set the opening 20 of the vent position by an operator within the motor vehicle 10. The mesh member 14 of this invention allows for any vent position of the roof panel 12 from the completely closed position to the fully opened and vent position. Further, the mesh member 14 collapses fully within the gutter guide assembly 18 such that it does not obstruct movement of the roof panel 12 toward the fully opened position. The fully opened position is accomplished as is shown in FIGS. 4 through 6 by lowering the rearward portion of the roof panel 12 and moving it rearward as indicated by the arrow 34 to completely uncover the opening 20.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A movable panel assembly comprising;
   a panel comprising front, rear and first and second sides and movable longitudinally from a closed position blocking an opening within a vehicle roof to an open position where said panel is substantially clear of the opening, and from said closed position to a vent position where said panel is pivoted about said front side such that said rear side is lifted upward relative to the vehicle roof to define a vent opening;
   a gutter guide assembly movable with said panel; and
   a mesh member attached to said gutter guide assembly and to said panel for blocking at least a portion of said vent opening when said panel is in said vent position, said mesh member movable with said panel to said open position.

2. The assembly of claim 1, wherein said mesh member includes a plurality of openings to allow air flow through said mesh member.

3. The assembly of claim 1, wherein said mesh member moves longitudinally with said panel relative to the vehicle roof.

4. The assembly of claim 3, wherein said mesh member collapses allowing said panel to slide relative to the vehicle roof.

5. The assembly of claim 1, wherein said mesh member is collapsible.

6. The assembly of claim 1, wherein said mesh member includes a plurality of openings sized to prevent at least some water from passing through said mesh member.

7. A movable roof panel assembly for a vehicle roof comprising:
   a panel disposed within an opening within the vehicle roof comprising front, rear and first and second sides, said panel selectively movable from a closed position to an open position where said panel is moved substantially out of the opening, said panel also moveable from said closed position to a vent position where said panel is moved upward relative to the vehicle roof;
   a gutter guide assembly movable with said panel between said closed position and said open position; and
   a mesh member attached to said panel and to said gutter guide assembly said mesh member extending between said panel and said gutter guide assembly along a side of said panel in said vent position to block said vent opening, said mesh member movable longitudinally with said panel between said closed and said open position, wherein said mesh member comprises a flexible sheet collapsible within said gutter guide assembly.

8. The assembly as recited in claim 7, wherein movement of said panel between said closed position and said open position comprises pivoting movement of said panel downwardly below the vehicle roof followed by rearward movement of said panel and said gutter guide assembly to substantially unblock the opening.

9. The assembly as recited in claim 7, wherein said panel comprises a window.

10. The assembly as recited in claim 7, wherein said mesh member comprises plastic material having a plurality of perforations.

11. The assembly as recited in claim 7, wherein said mesh member comprises elastic material stretchable between said gutter guide assembly and said panel.

* * * * *